United States Patent [19]

Kitabatake et al.

[11] Patent Number: 4,883,830
[45] Date of Patent: Nov. 28, 1989

[54] COATING RESIN COMPOSITION

[75] Inventors: Michiharu Kitabatake, Hiratsuka; Akira Tominaga, Chigasaki, both of Japan

[73] Assignee: Kansai Paint Co., Ltd., Hyogo, Japan

[21] Appl. No.: 266,895

[22] Filed: Nov. 3, 1988

[51] Int. Cl.$^4$ .................. C08G 59/04; C08G 59/24
[52] U.S. Cl. .................................. 523/414; 528/103; 528/104; 204/181.7
[58] Field of Search ............... 528/103, 104; 523/414; 204/181.7

[56] References Cited

U.S. PATENT DOCUMENTS

| | | | |
|---|---|---|---|
| 4,507,461 | 3/1985 | Bowditch | 528/104 |
| 4,522,814 | 11/1985 | Cavitt et al. | 528/104 X |
| 4,608,313 | 8/1986 | Hickner et al. | 528/103 X |
| 4,698,141 | 10/1987 | Anderson et al. | 528/103 X |
| 4,810,535 | 3/1989 | McCollum et al. | 528/103 X |
| 4,820,784 | 4/1989 | Massingill et al. | 528/103 X |

Primary Examiner—Earl Nielsen
Attorney, Agent, or Firm—Wenderoth, Lind & Ponack

[57] ABSTRACT

A coating resin composition comprising mainly an epoxy-polyamine resin obtained by adding (d) an amine compound having active hydrogen to an epoxy resin, said epoxy resin being a reaction product of
(a) a diepoxide compound represented by the following formula (I)

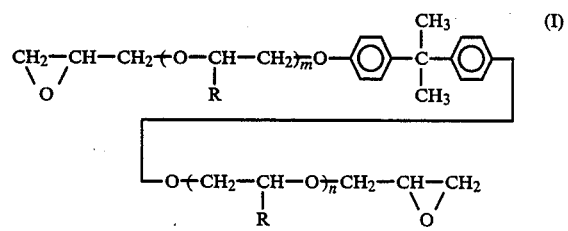

wherein R represents a lower alkyl group or —CH$_2$OR' wherein R' represents a hydrocarbon group having 1 to 10 carbon atoms, and m+n is an integer of 1 to 6
(b) a bisphenol, and
(c) optionally, a bisphenol diglycidylether,
(d) an amine compound having active hydrogen.

14 Claims, No Drawings

COATING RESIN COMPOSITION

This invention relates to a novel coating resin composition. More specifically, it relates to a coating resin composition improved in thick film coating applicability (coatability) and corrosion resistance and suitable for cationic electrodeposition coating.

As a resin composition for cationic electrodeposition coating, there has hitherto been known, for example, a resin composition described in U.S. Pat. Nos. 3,947,339 and 4,017,438, which comprises an epoxypolyamine resin obtained by reacting an epoxy-containing resin and a polyamine resin, and a polyisocyanate hardener blocked with alcohols As said epoxy-containing resin, from the viewpoint of corrosion resistance, usually bisphenol A diglycidylether, the molecular weight of which is increased by using bisphenol A, is used, and an epoxy resin that is plasticized by introducing a plasticity modifier having a soft segment such as polyester, polyether, polyamide, polybutadiene and a butadiene-acrylonitrile copolymer thereinto is practically used.

Recently, in the fields of electrodeposition coating of automobile bodies and lower portions, development of a paint having a thick film coating applicability and a high corrosion resistance has been strongly demanded from the viewpoint of appearances and durability of a coated film.

In order to comply with these demands, if the amount of the conventional plasticity modifier for an epoxy resin to impart a thick film coating applicability thereto is increased, a weak portion in corrosion resistance is introduced into the resin and a sufficient corrosion resistance cannot be obtained; on the other hand, if the amount of the plasticity modifier is decreased in an attempt to reinforce the corrosion resistance, the thick film coating applicability cannot be obtained.

With a view to obtaining a resin composition having both a thick film coating applicability and a high corrosion resistance, the present inventors have made assiduous investigations and have found that by using an epoxy resin to which a specific alkylene oxide compound is introduced in a specified amount, the aforesaid demands could be achieved. This finding has led to the present invention.

According to this invention, there is provided a coating resin composition comprising mainly of an epoxypolyamine resin obtained by adding (d) an amine compound having active hydrogen to an epoxy resin, said epoxy resin being a reaction product of
(a) a diepoxide compound represented by formula (1)

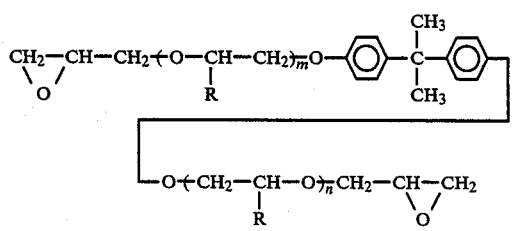

wherein R represents a lower alky group or —CH$_2$OR′ wherein R′ represents a hydrocarbon group having 1 to 10 carbon atoms, and m+n is an integer of 1 to 6,
(b) a bisphenol, and
(c) optionally, a bisphenoldiglycidylether.

In the specification and appended claims, the term "lower" means that group or compound that follows this term has not more than 6, preferably not more than 4 carbon atoms. "A lower alkyl group" means a linear or branched alkyl group such as, for example, a methyl, ethyl, propyl, isopropyl, sec-butyl or tert-butyl group.

The diepoxide compound (a) represented by formula (I) used in this invention is obtained by adding to bisphenol A, a 1,2-alkylene oxide compound represented by the following formula (II)

wherein R is the same as defined in (I) and then epoxidizing the adduct with an epihalohydrin such as epichlorohydrin. In the so obtained diepoxide compound, it seems that an alkyleneoxy structure —CH$_2$—CH(-R)—O— which is a plastic structure constitute a recurring unit with a hard bisphenol A structure at relatively short intervals so that it has a thick film coating applicability and exhibits a high corrosion resistance.

When ethylene oxide is used as an alkylene oxide to be added to bisphenol A, such advantage is not obtained. The present invention discloses that by using a 1,2-alkylene oxide compound specified by the aforesaid formula (II), the aforesaid demands can be satisfied for the first time. When ethylene oxide is used as an alkylene oxide, the obtained diepoxide compound comes to have decreased hydrophobic property and decreased corrosion resistance.

In the 1,2-alkylene oxide compound of the aforesaid formula (II), as "a lower alkyl group" represented by R, a methyl group and an ethyl group are suitable among those groups. "A hydrocarbon group having 1 to 10 carbon atoms" represented by R′ may be any one of an aliphatic, alicyclic, aromatic or aromatic-aliphatic group. Specific examples include (C$_1$–C$_{10}$) alkyl groups such as a methyl, ethyl, propyl, isopropyl, butyl, isobutyl, sec-butyl, tert-butyl, pentyl, isoamyl, heptyl, octyl, 2-ethylhexyl or decyl group; (C$_2$–C$_4$) alkenyl groups such as a vinyl or allyl group; (C$_5$–C$_7$) cycloalkyl groups such as cyclopentyl, cyclohexyl or cycloheptyl group; (C$_6$–C$_{15}$) aryl groups such as a phenyl, tolyl or p-sec-butylphenyl group; and (C$_7$–C$_{10}$) aralkyl groups such as a benzyl or phenethyl group.

The preferred embodiments of the 1,2-alkylene oxide compound of formula (II) include 1,2-alkylene oxides such a 1,2-propylene oxide and 1,2-butylene oxide; alkylglycidylethers such as isopropylglycidylether, butylglycidylether and 2-ethylhexylglycidylether; alkenylglycidylethers such as vinylglycidylether and allylglycidylether; cycloalkylglycidylethers such as cyclopentylglycidylether and cyclohexylglycidylether; and arylglycidyl ethers such as phenylglycidylether and p-sec-butylglycidylether. Above all, an alkylene oxide having 3 or 4 carbon atoms and a (C$_3$–C$_8$) alkylglycidylether are suitable.

In the diepoxide compound of the aforesaid formula (I), m and n are independently zero or an integer, and the sum of (m+n) is an integer within the range of 1 to 6, preferably 1 to 3. Especially, when R represents —CH$_2$OR′, it is suitable that m=n=1.

In the present invention, the diepoxide compound (a) represented by the formula (I) is reacted with the bisphenol (b) and optionally, further with the bisphenol diglycidylether (c), to the reaction product of which, the amine compound (d) having active hydrogen is subjected to addition reaction to give an epoxy-polyamine resin.

As modes of the reaction to obtain said epoxy-polyamine resin, the following modes may be illustrated.

(i) A method of reacting the diepoxide compound (a) with the bisphenol (b) in an amount of hydroxyl group less than an equivalent of an oxirane group in said diepoxide compound, and then reacting the amine compound (d) with the terminal oxirane group of the obtained epoxy resin;

(ii) A method of reacting the diepoxide compound (a) with the bisphenol (b) in an amount in excess of hydroxyl groups over an equivalent of an oxirane group in said diepoxide compound, and then reacting more than an equivalent of bisphenoldiglycidylether (c) with the terminal hydroxyl group of the obtained resin and then reacting the amine compound (d) with the terminal oxirane group of the obtained epoxy resin.

(iii) A method of simultaneously reacting the bisphenol (b) with the oxirane groups of the diepoxide compound (a) and the bisphenoldiglycidylether (c) in an amount of hydroxyl group less than an equivalent of the oxirane group of the total of (a)+(c), and then reacting the amine compound (d) with the terminal oxirane groups of the obtained epoxy resins.

In the above methods (i), (ii) and (iii), addition reaction of the amine compound (d) may be simultaneously carried out with increasing of the molecular weight of the epoxy resin. Of the above methods (i), (ii) and (iii), the method (ii) is especially preferred in respect of control of the resin production.

The typical examples of the bisphenol (b) used in the above reactions include bis(4-hydroxyphenyl)-2,2-propane, bis(4-hydroxyphenyl)-1,1-ethane, bis(4-hydroxyphenyl)-methane, 4,4'-dihydroxydiphenylether, 4,4'-dihydroxydiphenylsulfone, bis(4-hydroxyphenyl)-1,1-isobutane and bis(4-hydroxy-3-t-butylphenyl)-2,2-propane.

As the bisphenoldiglycidylether (c), bisphenoldiglycidylether having a number average molecular weight of at least about 320, preferably about 340 to 2000 and an epoxy equivalent of at least about 160, preferably about 170 to 1000 is suitable, and especially a bisphenol A-type diglycidylether represented by the following formula

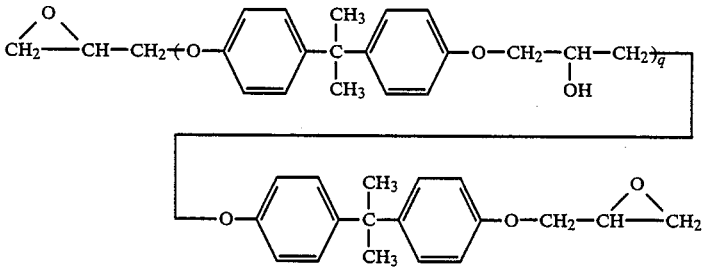

(wherein q is an integer of 0 to 4.) is particularly suitable in respect of the cost and corrosion resistance.

Upon producing an epoxy resin by reacting the diepoxide compound (a), the bisphenol (b) and as required, bisphenoldiglycidylether (c), it is preferable that the amount of the diepoxide compound (a) is usually 10 to 80% by weight, preferably 20 to 40% by weight based on the total amount of the above components (a), (b) and (c), and when the bisphenoldiglycidylether (c) is used, it is used usually in an amount of up to 70% by weight, preferably up to 50% by weight based on the total amount of the 3 components of (a), (b) and (c).

It is preferably from the viewpoint of the corrosion resistance and the thick film coating applicability that the obtained epoxy resin has usually a number average molecular weight of 1000 to 5000, preferably 1200 to 3000.

The reaction of said oxirane group and a hydroxyl group to obtain said epoxy resin may be carried out by a method known per se. For example, these groups may be reacted by heating at about 50° to about 200° C. for about 1 to about 15 hours in the presence of a catalyst such as a basic amino compound, for example, dimethyl benzylamine, tributyl amine and triethyl amine.

Then the so obtained epoxy resin is reacted with the amine compound (d) having active hydrogen to be made into an epoxy-polyamine resin.

As the amine compound (d) having active hydrogen, there may be illustrated amine compounds capable of introducing into the epoxy resin an amino group or a quaternary ammonium salt and having active hydrogen reactive with an oxirane group such as aliphatic, alicyclic or aromatic-aliphatic primary or sec-amine, alkanol amine and tert-amine salts. Typical examples of these amine compounds each having active hydrogen include the following amine compounds.

(1) Aldimine, ketimine, oxazoline or imidazoline obtained by reacting the primary amino group of an amine compound having one sec-amino group and at least one primary amino group such as diethylene triamine, hydroxyethylaminoethyl amine, ethylaminoethylamine and methylaminopropylamine with ketone, aldehyde or carboxylic acid under heating at, for example, about 100° to 230° C.;

(2) Secondary monoamines such as diethylamine, diethanolamine, di-n- or di-iso-propanolamine, N-methylethanolamine and N-ethylethanolamine;

(3) A compound containing a sec-amine obtained by Michael addition reaction of a monoalkanolamine such as monoethanolamine to a dialkyl(meth)acrlamide;

(4) Ketimines obtained by modifying the primary groups of alkanolamines such as monoethanolamine, neopentanolamine, 2-aminopropanol, 3-aminopropanol and 2-hydroxy- 2'(aminopropoxy)ethylether with ketone;

(5) Salts of tert-amines such as dimethylethanolamine, triethylamine, triisopropylamine and methyldiethanolamine and organic acids such as acetic acid and lactic acid;

(6) N,N,N'-trihydroxyalkyl-$\alpha,\omega$-diaminoalkane such as N,N,N'-trihyroxyethyl-1,2-diaminoethane.

Of these amine compounds, ketimine of diethylene triamine, diethanolamine, N-methylethanolamine, Michael adduct of monoethanolamine to dimethyl (meth- )acrylamide, ketimine of monoethanolamine and N,N,N′-trihydroxyethyl-1,2-diaminoethane are especially suitable in this invention.

By reacting these amine compounds having active hydrogen with the oxirane groups in the aforesaid epoxy resins, at, for example, about 30° to about 160° C. for about 1 to about 5 hours, epoxy-polyamine resins can be obtained. Addition of the amine compound into the epoxy resin may be, as mentioned above, carried out simultaneously with the increase of the molecular weight of the epoxy resin as well.

The amounts of these amine compounds having active hydrogen used in the above reaction are preferably such that the amine value of the epoxy-polyamine resin of this invention may be within the range of 15 to 100, especially 20 to 70. When the amine value is less than 15, dispersion of the resin in water becomes difficult, and when the amine value exceeds 100, the water resistance of the obtained coated film tends to become poor.

The amine value as referred to in this invention is defined as the amount in mg of KOH equivalent to the amount of hydrochloric acid required for neutralizing an equivalent to 1 g of the resin.

The aforesaid epoxy-polyamine resin may also be modified with reaction reagents, for example, a tertamine salt, a monocarboxylic acid, a sec-sulfide salt, a monophenol and a monoalcohol for controlling the water dispersibility and improving the smoothness of the coated film.

Further, it is possible to impart inner crosslinking property to the epoxy-polyamine resin by introducing a crosslinking functional group such as a block isocyanate group, β-hydroxycarbamic acid ester group, an α,β-unsaturated carbonyl group and an N-methylol group into the epoxy-polyamine resin.

The aforesaid reaction with the reaction reagent and introduction of the crosslinking functional group may be carried out prior to the addition of the amine compound having active hydrogen to the epoxy resin.

The so obtained epoxy-polyamine resin may be used together with an outer crosslinking agent.

The outer crosslinking agents are compounds having at least 2 crosslinking groups in one molecule, for example, a blocked polyisocyanate, a β-hydroxycarbamic acid ester of polyamine, a malonic acid ester derivative, a methylolated melamine and a methylolated urea. The blending ratio (solids ratio) of the epoxy-polyamine resin to these outer crosslinking agents is in the range of from 100/0 to 60/40, preferably from 90/10 to 65/35.

The aforesaid epoxy-polyamine resin may be made water-soluble or water-dispersible when used for electrodeposition for example. For that end, the amino group of the resin may be protonated by water-soluble organic acids such as formic acid, acetic acid and lactic acid and dissolved or dispersed in water.

The amount of the acid used for protonation (neutralization value) cannot be strictly defined, but usually about 5 to 40 mg of KOH, especially 10 to 20 mg of KOH per gram of the solid content of the resin is preferable to the characteristics of electrodeposition.

The so obtained aqueous solution or aqueous dispersion is especially suitable for cationic electrodeposition, and as required, a pigment, a solvent, a hardening catalyst and a surface active agent may be incorporated and used.

As a method and an apparatus for electrodeposition of the coating using the aforesaid aqueous solution or aqueous dispersion, the known method and the known apparatus hitherto used per se in cationic electrodeposition may be used. In this case, it is desirable to use an article as a cathode and a stainless steel or carbon sheet as an anode.

Conditions for the electrodeposition are not particularly limited, but generally it is desirable to electrodeposit the paint in a stirred state at bath temperature of 20° to 30° C., voltage of 100 to 400 V (preferably 200 to 300 V), current density of 0.01 to A/dm$^2$, time for passing current of 1 to 5 minutes, at an anode/cathode (A/C) area ratio of 2/1 to ½ and an anode-cathode distance of 10 to 100 cm.

A coated film formed on the article of a cathode can be washed, baked at about 140° to about 180° C. and cured.

Hereinbelow, the present invention will be more specifically illustrated by examples All "parts" and "%" used in examples are "by weight".

PRODUCTION EXAMPLE 1

A reactor equipped with a thermometer, a stirrer, a reflux condenser and a nitrogen gas inlet tube was, while passing in nitrogen gas, charged with 525 parts of propylene oxide-modified bisphenol A diglycidylether (note 1), 342 parts of bisphenol A and 36 parts of a methylisobutylketone solution of ketimine of monoethanolamine and ethylisobutylketone having an effective component of 80%, that were reacted at 160° C. until all the epoxy groups dissipated.

To the reaction mixture were added 665 parts of bisphenol diglycidylether having an epoxy equivalent of about 190 and 232 parts of methylisobutylketone solution of ketimine of monoethanolamine and methylisobutylketone having an effective component of 80%, and the resulting mixture was reacted at 140° C. until the concentration of an epoxy group became 0.27 millimole/g to obtain an epoxy resin having a number average molecular weight of about 1500. The resin was then diluted and cooled with 365 parts of ethyleneglycolmonobutylether. When the temperature became 100° C. 100 parts of a methylisobutylketone solution of diketimine of methylisobutylketone and diethylene triamine having an effective component of 80% was added, the mixture was reacted at 100° C. until the viscosity did not rise to obtain an epoxy-polyamine resin solution having a solid content of 81%. When this resin solution was adjusted with ethyleneglycolmonobutylether so as to make the concentration of the solid resin content 50%, it had a Gardner viscosity (at 25° C.) of W.

(note 1) propylene oxide-modified bisphenol A diglycidylether (trade name: GLYCI-ALE BPP-350, epoxy equivalent about 340, m+n in formula (I) equls 2 to 3, a product of Sanyo Chemical Industries, Ltd.)

PRODUCTION EXAMPLE 2

A reactor the same as used in Production Example 1 was, while passing in nitrogen gas, charged with 840 parts of propylene oxide-modified bisphenol A diglycidylether (note 1), 608 parts of bisphenol A diglycidylether having an epoxy equivalent of about 190, 410 parts of bisphenol A and 1.9 parts of dimethylbenzylamine, that were reacted at 160° C. until the concentration of an epoxy group became 1.1 millimole/g to obtain an epoxy resin solution having a number average molecular weight of about 1900. The resulting resin solution was diluted and cooled with 420 parts of ethyleneglycolmonobutylether. When the temperature became 100° C., 147 parts of diethanolamine was added, and the temperature was elevated to 120° C., and at this temperature, the mixture was reacted until the concentration of the epoxy group became 0.4 millimole/g, then the reaction mixture was cooled to 100° C. At this temperature, 109 parts of an ethylene glycol monobutyl ether solution of adduct of N,N-dimethyl-aminopropylacrylamide and monoethanolamine having an effective component of 80% was added to the mixture, and the mixture was reacted at 100° C. until the viscosity did not rise to obtain an epoxy-polyamine resin solution having a solid content of 82%.

When the concentration of the solid content of this resin solution was adjusted to 50% with ethylene glycol monobutylether, it had a Gardner viscosity (at 25° C.) of Y.

PRODUCTION EXAMPLE 3

A reactor the same as used in Production Example 1 was, while passing in nitrogen gas, charged with 525 parts of butylglycidylether-modified bisphenol A (note 2), 331 parts of bisphenol A and 36 parts of a methylisobutylketone solution of ketimine of monoethanolamine and methylisobutylketone having an effective component of 80%, that were reacted at 160° C. until all the epoxy groups dissipated.

To the resulting reaction mixture were added 676 parts of bisphenol A diglycidylether having an epoxy equivalent of about 190 and 232 parts of a methylisobutylketone solution of ketimine of monoethanolamine and methylisobutylketone having an effective component of 80%, and the mixture was reacted at 140° C. until the concentration of the epoxy group became 0.28 millimole/g to obtain an epoxy resin having a number average molecular weight of about 1500. The resulting epoxy resin was diluted and cooled with 365 parts of ethyleneglycolmonobutylether. When the temperature became 100° C., 100 parts of a methylisobutylketone solution of diketimine of methylisobutylketone and diethylenetriamine having an effective component of 80% was added, and the mixture was reacted at 100° C. until the viscosity did not rise to obtain an epoxy-polyamine resin solution having a solid content of 81%. When the concentration of the solid content of the resulting resin solution was adjusted to 50% with ethylene glycol monobutylether, it had a Gardner viscosity (at 25° C.) of XY.

(note 2) butylglycidylether-modified bisphenol A diglycidylether (trade name "XB-4122" comprising a main component of a diepoxide compound represented by the formula (I) wherein R' is an n-butyl group, a product of Ciba Geigy Ltd.)

PRODUCTION EXAMPLE 4

A reactor the same as used in Production Example 1 was, while passing in nitrogen gas, charged with 500 parts of 2-ethylhexylglycidylether-modified bisphenol A diglycidylether, 410 parts of bisphenol A and 1 part of dimethylbenzylamine, that were reacted at 160° C. until all the epoxy groups dissipated. The resulting reaction mixture was added with 874 parts of bisphenol A diglycidylether, and the mixture was reacted at 160° C. until the concentration of the epoxy group became 1.1 millimole/g to obtain an epoxy resin having a number average molecular weight of about 1800.

The resulting epoxy resin solution was diluted and cooled with 400 parts of ethyleneglycolmonobutylether, when the temperature became 80° C., 158 parts of diethanolamine and 80 parts of a methylisobutylketone solution of diketmine of methylisobutylketone and diethylenetriamine having an effective component of 80% were added, and the mixture was reacted at 100° C. until the viscosity did not rise to obtain an epoxypolyamine resin solution having a solid content of 83%. When the concentration of the solid content of the resulting resin solution was adjusted to 50% with ethyleneglycolmonobutylether, it had a Gardner viscosity (at 25° C.) of YZ.

PRODUCTION EXAMPLE 5

While passing in nitrogen gas, a reactor the same as used in Production Example 1 was charged with 476 parts of polypropylene glycol diglycidylether having an epoxy equivalent of about 317, 342 parts of bisphenol A and 36 parts of methylisobutylketone solution of ketimine of monoethanolamine and methylisobutylketone having an effective component of 80%, that were reacted at 160° C. until all the epoxy groups dissipated.

The resulting reaction mixture was added with 665 parts of bisphenol A diglycidylether having an epoxy equivalent of about 190 and 232 parts of a methylisobutylketone solution of ketimine of monoethanolamine and methylisobutylketone having an effective component of 80%, and the mixture was reacted at 140° C. until the concentration of the epoxy group became 0.28 millimole/g to obtain en epoxy resin having a number average molecular weight of about 1500.

The resulting epoxy resin was diluted and cooled with 365 parts of ethyleneglycolmonobutylether. When the temperature became 100° C., 100 parts of a methylisobutylketone solution of diketimine of diethylenetriamine and methylisobutylketone having an effective component of 80% was added, and the mixture was reacted at 100° C. until the viscosity did not rise to obtain an epoxy-polyamine resin solution having a solid content of 81%.

When the concentration of the solid content of the resulting resin solution was adjusted to 50% with ethyleneglycolmonobutylether, it had a Gardner viscosity (at 25° C.) of V.

PRODUCTION EXAMPLE 6

While passing in nitrogen gas, a reactor the same as used in Production Example 1 was charged with 450 parts of ethylene oxide-modified bisphenol A diglycidylether (note 3) having an epoxy equivalent of about 300, 342 parts of bisphenol A and 36 parts of a methylisobutylketone solution of ketimine of monoethanolamine and methylisobutylketone having an effective component of 80%, that were reacted at 160° C. until all the epoxy groups dissipated.

The resulting reaction mixture was added with 665 pats of bisphenol A diglycidylether having an epoxy equivalent of about 190 and 232 parts of a methylisobutylketone solution of ketimine of monoethanolamine and methylisobutylketone having an effective component of 80%, and the mixture was reacted at 140° C. until the concentration of the epoxy group became 0.29 millimole/g. to obtain an epoxy resin solution having a number average molecular weight of about 1500. The resulting resin solution was diluted and cooled with 350 parts of ethylene glycol monobutylether, when the temperature became 100° C., 100 parts of a methylisobutylketone solution of diketimine of diethylenetriamine and methylisobutylketone having an effective component of 80%, and the mixture was reacted at 100° C. until the viscosity did not rise to obtain an epoxypolyamine resin solution having a solid content of 81%. When the concentration of the solid content of the resulting resin solution was adjusted to 50% with ethyleneglycolmonobutylether, it had a Gardner viscosity (at 25° C.) of Y.

(note 3) ethylene oxide-modified bisphenol A diglycidylether (tradename "GLYCI-A1E BPE-300" having an epoxy equivalent of about 300, a product of Sanyo Chemical Industries, Ltd.)

cle sizes of less than 10 microns, and then the mixture was diluted to the concentration of the solid resin content 15% with deionized water.

The so obtained six kinds of the diluted paints were cationically electrodeposited on a non-treated steel sheet and a steel sheet treated with Bt-3080 (zinc phosphate) at a bath temperature of 28° C. at a voltage of 250 V for 3 minutes. The resulting electrodeposited steel sheets were baked at 160° C. for 20 minutes and subjected to anticorrosion tests.

The resin blends and the test results are shown in Table 1.

TABLE 1

| Run No. | | | Examples | | | | Comparative Examples | |
|---|---|---|---|---|---|---|---|---|
| Epoxy polyamine resin | Kind (Production Example No.) | | Production Example 1 | Production Example 2 | Production Example 3 | Production Example 4 | Prodcution Example 5 | Production Example 6 |
| Resin blend | resin Amount of solid content (parts) | | 84 | 80 | 84 | 78 | 84 | 84 |
| | Methylethylketoxime-blocked isophorone diisocyanate Solid content (parts) | | 16 | 20 | 16 | 22 | 16 | 16 |
| Film thickness (micron) (Note 4) | | | 40 | 45 | 45 | 40 | 50 | 22 |
| State of the coated surface | | | ◯ | ◯ | ◯ | ◯ | ◯ | ◯ |

| Run No. | | | Examples | | | | Comparative Examples | |
|---|---|---|---|---|---|---|---|---|
| Anticorrosion test | Non-treated steel sheet | Salt water spray resistance (Note 5) 480 hours | 1.5 mm | 2 mm | 2.5 mm | 1.5 mm | 4 mm | 5 mm < |
| | | Salt water immersion resistance (Note 6) 480 hours | ◯ | ◯ | ◯ | ◯ | X | △ |
| | Steel sheet treated with Bt-3080 | Salt water spray resistance (Note 5) | | | | | | |
| | | 1000 hrs | 1 mm > | 1 mm > | 1 mm > | 1 mm > | 5-6 mm | 5-6 mm |
| | | 1500 hrs | 1-2 mm | 1-2 mm | 1-2 mm | 1-2 mm | — | — |
| | | Salt water immersion resistance (Note 6) 800 hrs | ◯ | ◯ | ◯ | ◯ | ◉ | ◯ |

(Note 4) Film thickness: Thickness of the electrodeposited coating film when welded at 250 V for 3 minutes.

EXAMPLES 1-4 AND COMPARATIVE EXAMPLES 1, 2

Each of the six kinds of the resin solutions obtained in the foregoing Production Examples 1 to 6 was blended with methylethylketoxime-blocked isophorone diisocyanate such that the amount of the blocked isocyanate group is equivalent to the total amount of primary hydroxyl group and primary amino group in the epoxypolyamine resin.

To 100 parts by weight of the solid content of each of the so blended resin compositions, were added 1 part of polypropylene glycol (trade name "SANNIX PP4000", a product of Sanyo Chemical Industries, Ltd.), 0.96 part of acetic acid and 1 part of lead acetate, the mixture was heated to 60° C., deionized water was gradually added with stirring to disperse these ingredients in water to obtain stable emulsions each having a solid resin content of 30%.

To 100 parts of the solid resin content of the so obtained emulsion were added 3 parts of basic lead silicate, 13 parts of titanium white, 0.3 part of carbon black, 3 parts of clay, 2 parts of dibutyl tin oxide and 1 part of a nonionic surface active agent (trade name "NOIGEN 142 B," a product of Dai-ichi Kogyo Seiyaku Co., Ltd.), the mixture was subjected to ball mill grinding to parti- The anticorrosion tests in Table 1 were carried out according to the following methods.

(Note 5) Salt water spray resistance

The electrodeposited film or the steel sheet was cross cut with a knife so that the cut sheet reached the steel sheet, the cut was tested according to JIS Z 2371 to measure the widths of rust and blister from the cut. The test was carried out for 480 hours in the case of the non-treated steel sheet, and for 1000 hours and 1500 hours in the case of the steel sheet treated with Bt-3080.

(Note 6) Salt water immersion resistance

The electrodeposited steel sheet was immersed in a 5% aqueous NaCl solution and the change in the general section was observed. The immersion time was 480 hours when the article was a non-treated steel sheet, and 800 hours when the article was the steel sheet treated with Bt-3080.

The assessment standards were as follows.
◉ : No change
◯ : The coated surface changed, but degrees of blister and peeling were less than 5%.
⊛ : Degrees of blister and peeling were 5 to 10%.
△: Degrees of blister and peeling were 10 to 50%.

X: Degrees of blister and peeling were not less than 50%.

The coating resin composition consisting mainly of an epoxy-polyamine resin wherein a diepoxide compound represented by the formula (I) is introduced into the skeleton of a bisphenol A-type epoxy resin according to this invention can give a coated film having a film thickness of not less than 35 microns and excellent thick film coating applicability and a corrosion resistance, the coated film being free from defect in coated surface by cationic electrodeposition under ordinary electrodeposition conditions (voltage 200 to 300 V, time for passing current of 1 to 5 minutes).

What we claim is:

1. A coating resin composition comprising mainly an epoxy-polyamine resin obtained by adding (d) an amine compound having active hydrogen to an epoxy resin, said epoxy resin being a reaction product of
   (a) a diepoxide compound represented by the following formula (I)

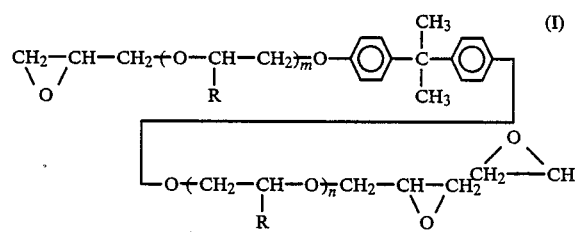
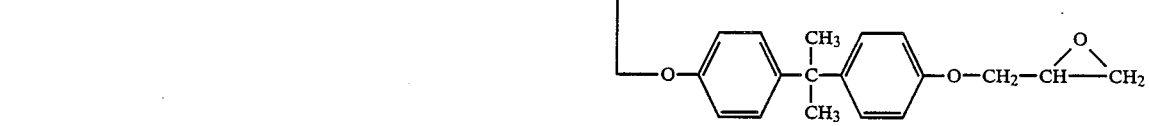

wherein R represents a lower alkyl group or —CH$_2$OR' wherein R' represents a hydrocarbon group having 1 to 10 carbon atoms, and m+n is an integer of 1 to 6
   (b) a bisphenol, and
   (c) optionally, a bisphenol diglycidylether,
   (d) an amine compound having active hydrogen.

2. The coating resin composition of claim 1 wherein the diepoxide compound of the formula (I) is obtained by reacting epichlorohydrin with an adduct of bisphenol A to a 1,2-alkylene oxide represented by formula (II)

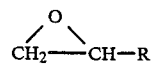 (II)

wherein R is as defined in claim 1.

3. The coating resin composition of claim 2 wherein said 1,2-alkylene oxide is a 1,2-alkylene oxide having 3 or 4 carbon atoms.

4. The coating resin composition of claim 2 wherein said 12-alkylene oxide is a (C$_3$–C$_8$) alkyl glycidylether.

5. The coating resin composition of claim 1 wherein said m+n is an integer of 1 to 3.

6. The coating resin composition of claim 1 wherein said epoxy resin is obtained by reacting the diepoxide compound (a) represented by the formula (I) with the bisphenol (b) in an amount in excess of hydroxyl group over an equivalent of an oxirane group in said diepoxide compound, and then reacting the resulting reaction product with the bisphenol diglycidylether (C).

7. The coating resin composition of claim 1 wherein said bisphenol (b) is selected from the group consisting of bis(4-hydroxy)phenyl-2,2-propane, bis(4-hydroxyphenyl)-1,1-ethane, bis(4-hydroxyphenyl)-methane, 4,4'-dihydroxydiphenylether, 4,4'-dihydroxydiphenylsulfone, bis(4-hydroxyphenyl)-1,1-isobutane and bis(4-hydroxy-3-t-butylphenyl)-2,2-propane.

8. The coating resin composition of claim 1 wherein said bisphenoldiglycidylether (c) is a bisphenol A-type diglycidylether represented by the formula

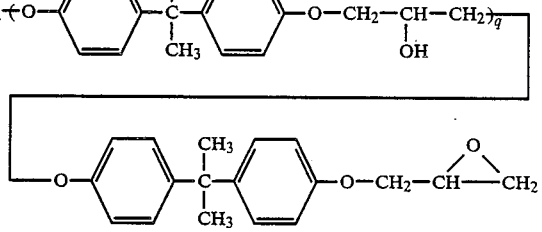

(wherein q is an integer of 0 to 4).

9. The coating resin composition of claim 1 wherein said diepoxide compound (a) represented by the formula (I) is used in an amount of 10 to 80% by weight based on the total amount of the 3 components of (a), (b) and (c).

10. The coating resin composition of claim 1 wherein said bisphenol diglycidylether (c) is used in an amount of up to 60% by weight based on the total amount of the 3 components of (a), (b) and (c).

11. The coating resin composition of claim 1 wherein said amine compound (d) is selected from the group consisting of ketimine of diethylenetriamine, diethanolamine, N-methylethanolamine, Michael adduct of monoethanolamine to dimethyl (meth)acrylamide, ketimine of monoethanolamine and N,N,N'-trihydroxyethyl-1,2-diaminoethane.

12. The coating resin composition of claim 1 wherein said epoxypolyamine resin has an amine value within the range of 15 to 100.

13. A cationic electrodeposition paint comprising a water-soluble or water-dispersible coating resin composition of claim 1.

14. A method for cationic electrodeposition coating by passing an electric current through an aqueous bath containing the resin of claim 1.

* * * * *

UNITED STATES PATENT AND TRADEMARK OFFICE
CERTIFICATE OF CORRECTION

PATENT NO. : 4,883,830
DATED : November 28, 1989
INVENTOR(S) : Michiharu KITABATAKE et al.

It is certified that error appears in the above-identified patent and that said Letters Patent is hereby corrected as shown below:

In the heading of the patent, insert

--Foreign Application Priority Data

November 6, 1987 [JP]   Japan ................ 279,289/87

November 7, 1987 [JP]   Japan ................ 281,778/87--.

In [57] ABSTRACT, line 2 from the bottom, change the comma (second occurrence) to a period;

last line, delete in its entirety.

Column 1, line 47, delete "of";

line 51, change "(1)" to --(I)--.

Column 2, line 2, before "group" insert --the--;

UNITED STATES PATENT AND TRADEMARK OFFICE
CERTIFICATE OF CORRECTION

PATENT NO. : 4,883,830            Page 2 of 4

DATED : November 28, 1989

INVENTOR(S) : Michiharu KITABATAKE et al.

It is certified that error appears in the above-identified patent and that said Letters Patent is hereby corrected as shown below:

line 20, change "constitute" to --constitutes--.

Column 3, line 62, change "as required" to --optionally--.

Column 4, line 3, change "preferably" to --preferable--;

line 5, change "has usually" to --usually has--.

Column 5, line 32, change "block" to --blocked--.

Column 6, line 17, after "examples" insert a period;

UNITED STATES PATENT AND TRADEMARK OFFICE
CERTIFICATE OF CORRECTION

PATENT NO. : 4,883,830  Page 3 of 4

DATED : November 28, 1989

INVENTOR(S) : Michiharu KITABATAKE et al.

It is certified that error appears in the above-identified patent and that said Letters Patent is hereby corrected as shown below:

line 41, after "C." insert a comma.

Column 11, line 52, change the comma (second occurrence) to a period;

line 53, delete in its entirety.

Column 12, line 5, change "12" to --1,2--;

line 14, change "(C)" to --(c)--;

line 23, change "bisphenoldiglycidylether" to --bisphenol diglycidylether--;

UNITED STATES PATENT AND TRADEMARK OFFICE
CERTIFICATE OF CORRECTION

PATENT NO. : 4,883,830

DATED : November 28, 1989

INVENTOR(S) : Michiharu Kitabatake, et al.

It is certified that error appears in the above-identified patent and that said Letters Patent is hereby corrected as shown below:

line 46, change "60%" to --70%--;

line 56, change "epoxypolyamine" to --epoxy-polyamine--.

Signed and Sealed this

Eighteenth Day of December, 1990

Attest:

HARRY F. MANBECK, JR.

Attesting Officer     Commissioner of Patents and Trademarks